United States Patent [19]

Maru

[11] Patent Number: 4,661,965
[45] Date of Patent: Apr. 28, 1987

[54] TIMING RECOVERY CIRCUIT FOR MANCHESTER CODED DATA

[75] Inventor: Tsuguo Maru, Tokyo, Japan

[73] Assignee: NEC Corporation, Japan

[21] Appl. No.: 787,419

[22] Filed: Oct. 15, 1985

[30] Foreign Application Priority Data

Oct. 15, 1984 [JP] Japan .................. 59-215831

[51] Int. Cl.⁴ ............................................. H04L 7/02
[52] U.S. Cl. ...................................... 375/110; 375/82; 375/87; 328/63
[58] Field of Search ............... 375/82, 87, 95, 110, 375/120, 111; 328/55, 63, 72

[56] References Cited

U.S. PATENT DOCUMENTS 4,606,050  8/1986  Sekigawa et al. ................... 375/95

OTHER PUBLICATIONS

"The Bell System Technical Journal", vol. 58, No. 1, Jan. 1979, pp. 139-143.

*Primary Examiner*—Benedict V. Safourek
*Assistant Examiner*—M. Huseman
*Attorney, Agent, or Firm*—Sughrue, Mion, Zinn, Macpeak and Seas

[57] ABSTRACT

A timing recovery circuit for recovering timing signals out of split phase or Manchester coded data, comprising dotting (DOT), frame synchronization (FS) and information (DATA) in digital form. A digital voltage controlled oscillator (VCO) provides a signal whose frequency is twice that of the timing signal of the split phase signal and a frequency divider generates a signal whose frequency is equal that of the timing signal. The outputs of the VCO and the frequency divider are selectively applied to a phase detector, also having as an input the split phase signal, for the generation of a feedback control signal, depending on whether the split phase signal is advanced or delayed. The higher-frequency VCO signal is applied during the DATA segment of the incoming signal while the frequency divider signal is applied during the DOT and FS segments.

4 Claims, 20 Drawing Figures

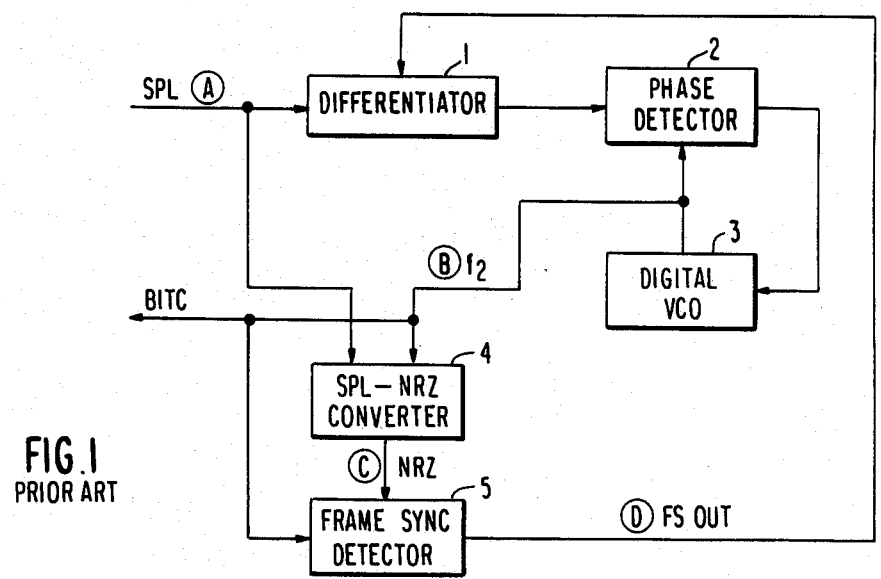
FIG. 1 PRIOR ART
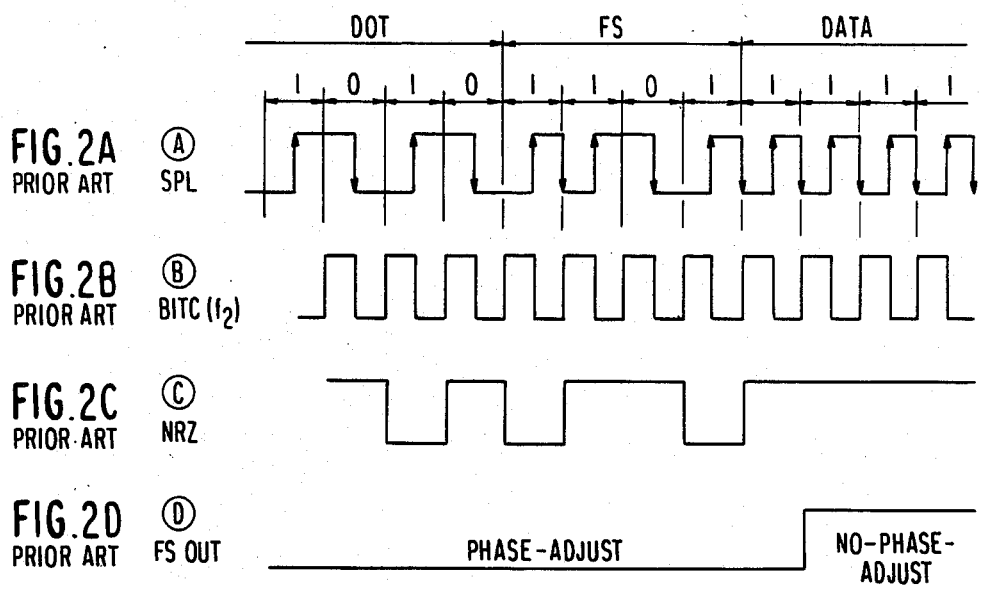
FIG. 2A PRIOR ART
FIG. 2B PRIOR ART
FIG. 2C PRIOR ART
FIG. 2D PRIOR ART

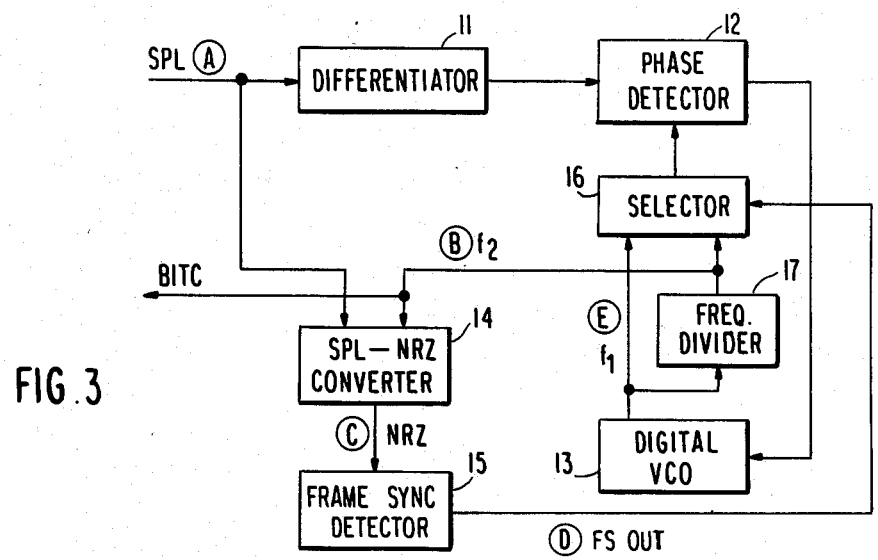
FIG. 3
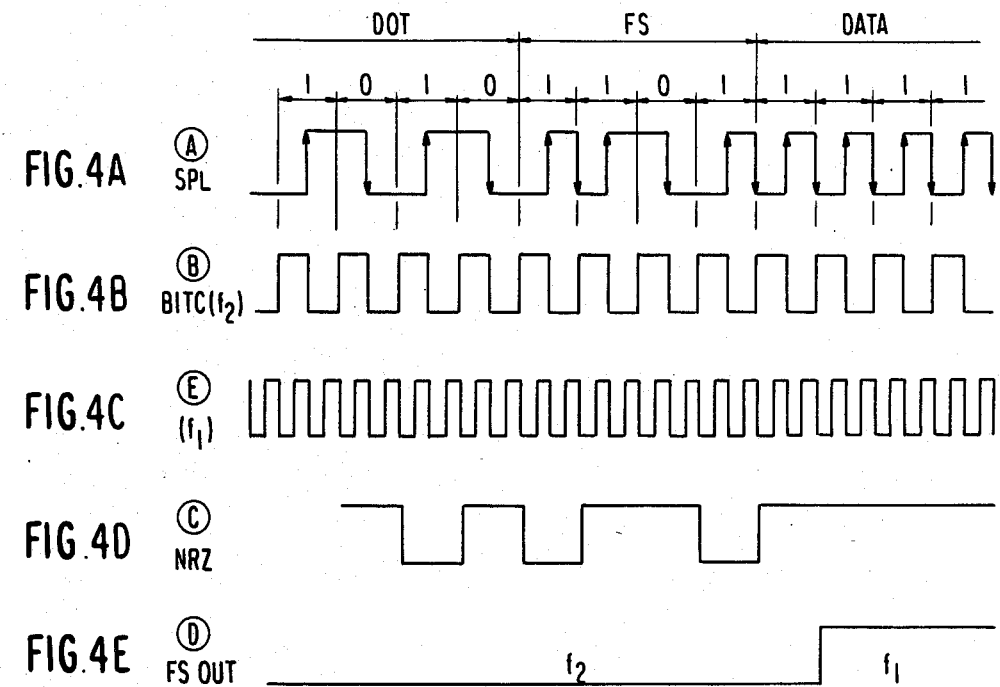
FIG. 4A  Ⓐ SPL
FIG. 4B  Ⓑ BITC(f$_2$)
FIG. 4C  Ⓔ (f$_1$)
FIG. 4D  Ⓒ NRZ
FIG. 4E  Ⓓ FS OUT

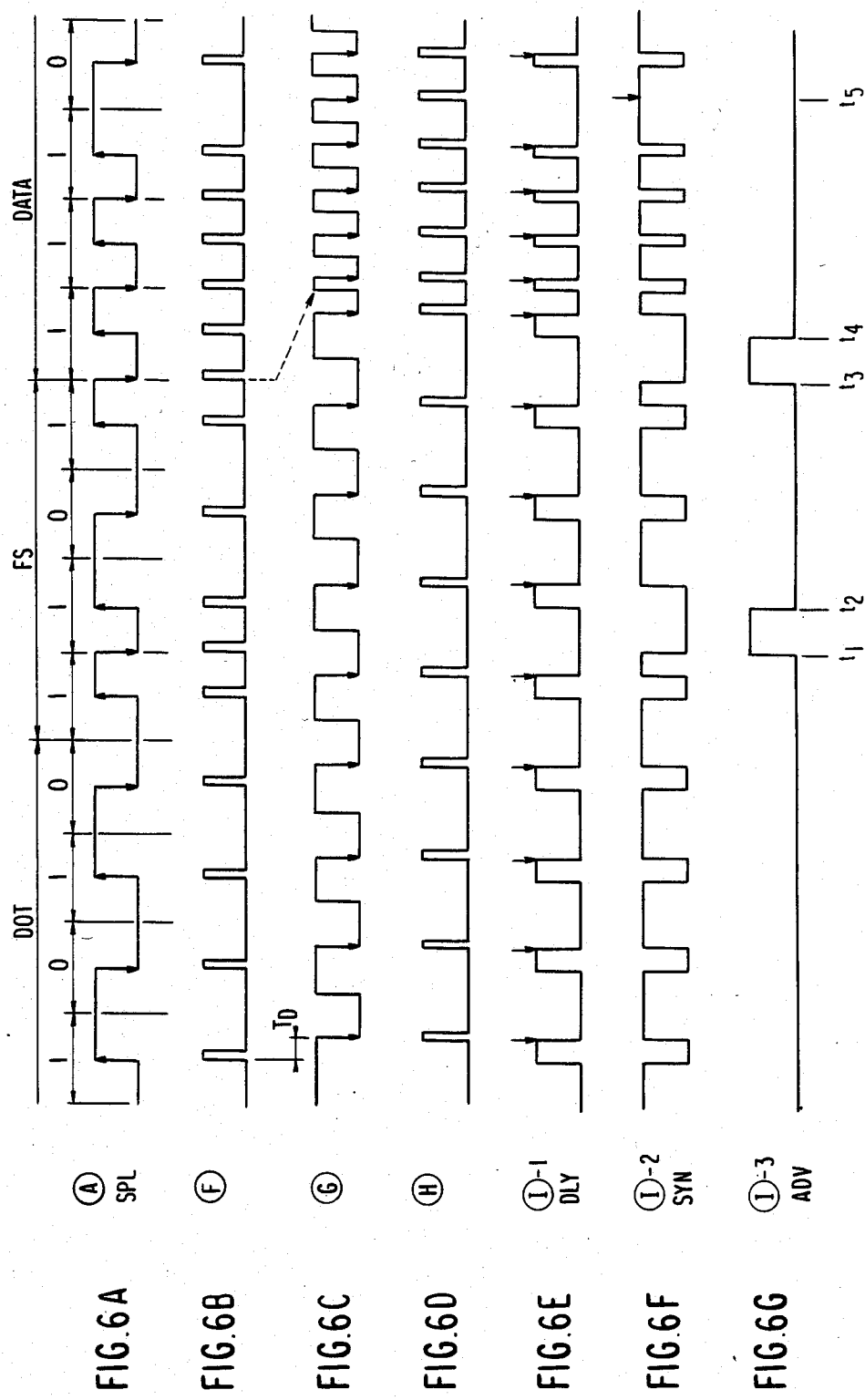

TIMING RECOVERY CIRCUIT FOR MANCHESTER CODED DATA

BACKGROUND OF THE INVENTION

The present invention relates to a timing recovery circuit and, more particularly, to a circuit for recovering timing signals out of split-phase or Manchester coded data.

There are both analog and digital versions of such a timing recovery circuit. An example of analog type timing recovery circuit is described in THE BELL SYSTEM TECHNICAL JOURNAL, Vol. 58, No. 1, January 1979, pp. 139–143. An analog type timing recovery circuit extracts the timing component of a frequency equal to half the bit rate of a preamble or dotting section of "1" and "0" added before the data, and achieves synchronization by using the extracted timing component. This kind of analog type recovery circuit has the disadvantage of complex circuitry, which prevents ready large-scale integration.

A digital type timing recovery circuit, as will be described afterwards with reference to some of the accompanying drawings, readily permits large-scale integration. However, it has its own problem that, if either "1" or "0" emerges consecutively in the data, the varying points of the data, which should be at the trailing edge of the clock, will be displaced by 180 degrees, making synchronization impossible. To avoid the phase displacement of the regenerated clock, the conventional digital timing recovery circuit controls an oscillator for timing synchronization only during the dotting section and the synchronized oscillator is maintained during the data section. In this case, however, the stability of the oscillator may pose a problem. With an insufficiently stable oscillator, the frame length of the data cannot be made great enough, resulting in a poor efficiency of channel utilization. On the other hand, a sufficiently stable oscillator would be too expensive and constitute a disadvantage.

SUMMARY OF THE INVENTION

An object of the present invention, therefore, is to provide a digital type timing recovery circuit for split-phase or Manchester coded data, which permits ready large-scale integration.

Another object of the invention is to provide a digital type timing recovery circuit for Manchester coded data, which permits the frame length of data to be made substantially great without having to use a highly stable oscillator.

Still another object of the invention is to provide a digital type timing recovery circuit for Manchester coded data, which can supply stable timing signals even if either "1" or "0" consecutively is contained in the data.

According to the present invention, there is provided a timing recovery circuit comprising: means for detecting the varying points of a split-phase signal having a pattern of the repetition of logical "1" and "0" at its beginning; voltage-controlled oscillator (VCO) means for generating a signal whose frequency is twice as high as that of the timing signal of the split-phase signal and controlling the frequency of the generated signal in response to a control signal; means for dividing by two the output frequency of the VCO means; selector means for selectively supplying the output of the VCO means and that of the frequency dividing means; phase detector means for phase-comparing the output of the varying point detector means and that of the selector means, and supplying the VCO means with a signal indicating the relative delay or advance between the two outputs as the control signal; and control means for controlling the selector means so that it selects the output of the frequency dividing means during the repetitive pattern of logical "1" and "0" and that of the VCO means at other times.

BRIEF DESCRIPTION OF THE DRAWINGS

The foregoing and other objects, features and advantages of the present invention will become more apparent from the detailed description hereunder taken in conjunction with the accompanying drawings, wherein:

FIG. 1 is a block diagram showing a conventional digital type timing recovery circuit for Manchester coded data;

FIGS. 2A to 2D are diagrams showing waveforms in different parts of the timing recovery circuit shown in FIG. 1;

FIG. 3 is a block diagram showing a digital type timing recovery, circuit for Manchester coded data, which is a preferred embodiment of the invention;

FIGS. 4A to 4D are diagrams showing waveforms in different parts of the timing recovery circuit shown in FIG. 3;

FIGS. 6A to 6G are diagrams showing waveforms in different parts of the phase detector shown in FIG. 5.

DETAILED DESCRIPTION OF THE INVENTION

Figure 5:
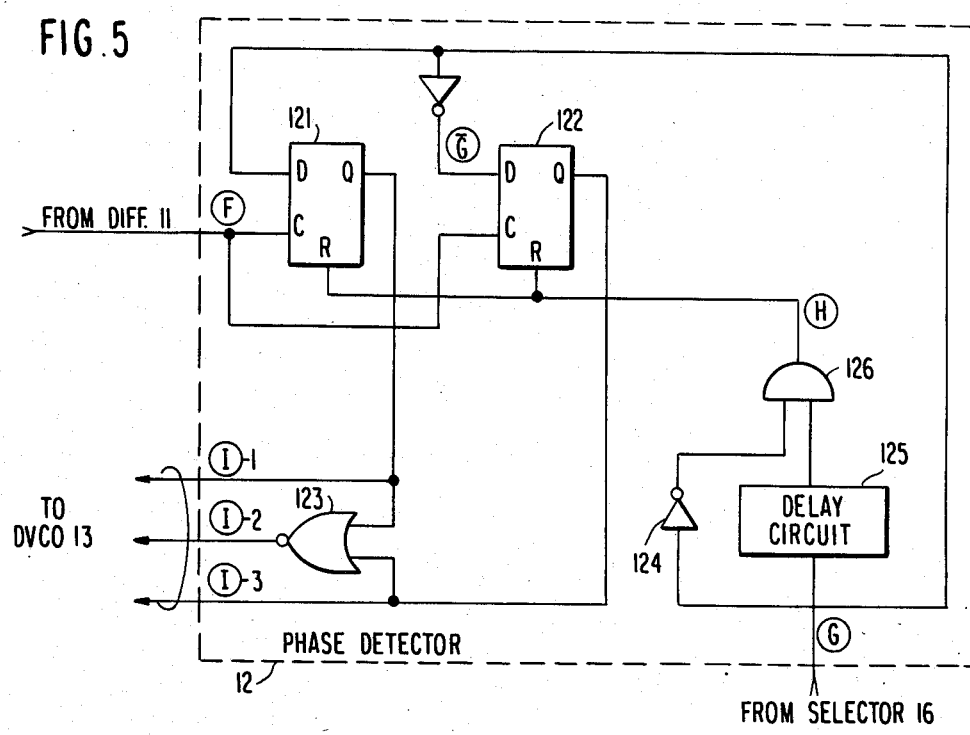
FIG. 5 is a detailed diagram of a phase detector of the circuit illustrated in FIG. 3.

To facilitate understanding of the present invention, a timing recovery circuit of the prior art will be described first. Referring to FIG. 1, the varying points of an input split-phase or Manchester coded signal A are detected by a differentiator circuit 1, and supplied to a phase detector 2, which phase-compares the varying points of the input signal A and a regnerated clock $f_2$ from a digital voltage-controlled oscillator (VCO) 3 and controls the oscillating frequency of the VCO 3 with the resultant phase difference signal. Control is thereby so effected that the trailing edge of the output clock $f_2$ of the VCO 3 concur with the varying points of the input signal A.

FIG. 2A shows the split-phase signal A, in which are provided data (DATA) and, before them, a dotting section (DOT), which consists of repetitions of logical "1" and "0", plus a frame synchronization (sync) signal (FS) between DATA and DOT if it is a synchronized type communication system. FIG. 2B shows the extracted clock $f_2$, so controlled that the varying points of the signal A concur with the trailing edges of the clock $f_2$. However, if either "1" or "0" emerges consecutively in a signal later than the frame sync signal FS, a varying point may also occur at any other point displaced by 180 degrees than the trailing edge of the clock $f_2$, thereby preventing proper synchronization. For this reason, the frame sync signal FS is detected by a split-phase signal-to-non-return to zero (SPL-NRZ) converter 4 and a frame sync signal detector circuit 5, and the detected signal (D) is used to render the differentiator 1 non-operative. Jitters occurring in the regenerated clock are thereby removed.

However, since the phase of the clock is not adjusted during the DATA section in the timing recovery circuit of FIG. 1 as stated above, there is needed a stably operating oscillator during this section. A highly stable oscillator is expensive, and therefore constitutes a disadvantage. Conversely, an unstable oscillator would make it impossible to achieve a sufficient frame length and result in a lower efficiency of channel utilization.

FIG. 3 is a block diagram of a preferred embodiment of the present invention. Referring to the figure, an input split-phase signal A is entered into a differentiator circuit 11 and a split-phase signal-to-non-return to zero (SPL-NRZ) converter 14. The differentiator circuit 11 detects the varying points of the input point A, and supplies them to a phase detector 12. The phase detector 12, as will be described in detail later, phase-compares the output of differentiator 11 with the output of a selector 16, and supplies a phase error signal to a digital VCO 13 according to the delay or advance between them. The selector 16 selectively provides the phase detector 12 with a regenerated clock B having a frequency $f_2$ or with a signal E having a frequency $f_1$ which is twice the frequency $f_2$, in response to the output of a frame sync detector 15, which will be described presently. The VCO 13 controls the oscillating frequency $f_1$ according to the phase error signal. The output E having this frequency $f_1$ is bisected by a ½ frequency divider 17 into the regenerated clock B.

Out of an NRZ signal provided by the SPL-NRZ converter 14, the frame sync detector 15 detects a frame sync signal FS, and supplies a detection signal D to the selector 16. As mentioned above, the selector 16, according to the detection signal D, selects either the output E of the VCO 13 or the output B resulting from the ½ frequency division of the output E, and supplies the selected one to the phase detector 12. The output B is selected during the dotting section DOT and the frame sync signal section FS, while the output E is during the data section DATA. The SPL-NRZ converter 14, like the Manchester decoder shown on page 142 of the BSTJ referenced above, can be composed of an exclusive OR circuit; a well known pattern matching circuit can be used as the frame sync signal detector 15, and the selector 16 can be readily realized by a simple combination of logic circuits.

FIGS. 4A to 4E are timing charts showing the operation of the circuit of FIG. 3. The varying points of the split-phase signal A are phase-compared with the regenerated clock B having the frequency $f_2$ during the sections of dotting and the frame sync signal and with the clock E having the frequency $f_1$, which is twice as high as the frequency $f_2$, after the detection of the frame sync signal FS. It is seen that, as the object of phase comparison is switched to the clock E after the reception of the frame sync signal FS, even if "1" consecutively emerges, the varying point of the input signal A concurs with the trailing edge of the clock E. Further, even if "1" and "0" are repeated in the data section, in the absence of the varying point, the phase detector 12 will substantially perform no comparison, and accordingly no jitters will occur in the regenerated clock. Reasons for this will be apparent from the description referring to FIGS. 5 and 6A to 6G. Therefore, unlike the prior art, no varying point of the split-phase signal will arise 180 degrees off, so that the phase-adjusting operation can be continued even during the data section. Since the clock B, which is the intended timing signal, is provided by ½ frequency-division of the output E of the VCO 13, the phase of the clock B is matched to that of the input signal A from the beginning of the input signal, the dotting section, till the end of the data section.

Next will be described in detail the phase detector 12. Referring to FIG. 5, the differentiator 11 provides clock terminals C of D-type flip-flops 121 and 122 with a differentiated signal F which has obtained from the input split-phase signal A. In response to the signal F, the flip-flops 121 and 122 latch the output G of the selector 16 and the inverted output $\overline{G}$, respectively. A high-level output at the terminal Q of flip-flop 121 indicates that the output G, i.e:, the regenerated timing signal B is behind the timing of input signal A. Meanwhile, a high-level output at the terminal Q of flip-flop 122 indicates that the regenerated timing signal B precedes the timing of input signal A. The output I-1 and I-3 of flip-flops 121 and 122 are subject to NOR operation at a NOR gate 123 to provide a signal I-2 indicating that the regenerated timing signal B is in synchronism with the timing of input signal A. The flip-flops 121 and 122 are reset by a reset signal H which is produced from the output G by using an inverter 124, delay circuit 125 and AND gate 126.

In FIGS. 6A to 6G, the selected output G is behind by time $T_D$ with respect to the timing of input signal A. The varying points of the signal A are detected by the differentiator to produce the signal F. This signal F samples the outputs G and at flip-flops 121 and 122 to generate the signals I-1 and I-3, respectively. The signals I-1 and I-3 are NORed at NOR gate 123 to generate the signal I-2.

In response to the trailing edge of the output G, DVCO 13 (FIG. 3) latches any one of the signals I-1, I-2 and I-3, as indicated by small arrows in FIGS. 6E to 6G. Since the D-type flip-flops 121 and 122 have a somewhat delay themselves, DVCO 13 can latch one of signals I-1, I-2 and I-3 before the flip-flops are reset by the reset signal H. When DVCO 13 latches the signal I-2, it generates a signal having a frequency $f_M$ substantially equal to twice the bit rate of input signal A. When DVCO 13 latches the signal I-1 or I-3, DVCO controls itself so as to generate a signal having a frequency $f_H$ or $f_L$, respectively. It is assumed that the bit rate of input signal A is 10 k bit/sec and the stability of DVCO 13 is $10^{-4}$. The frequency difference between the signal A and the output of DVCO becomes less than 1 Hz. The frequencies $f_H$ and $f_L$ may be set at 10.3 kHz and 9.7 kHz, respectively.

In the example shown in FIGS. 6A to 6G, DVCO controls itself so as to generate the frequency $f_H$ because it latches the signal I-1 except for a time $t_5$. At the time $t_5$, DVCO controls its output frequency to coincide it with the frequency $f_M$. However, this frequency control substantially does not influence the output frequency of DVCO because the frequency difference between the frequency $f_M$ and the bit rate of signal A is less than 1 Hz. On the contrary, a frequency control according to the signal I-1 or I-3 significantly influences the outputs frequency of DVCO because the frequency $f_H$ or $f_L$ is sufficiently apart from the input bit rate, namely, by 300 Hz.

The signal I-3 that is indicative of the advance of output G with respect to the signal A arises at a time $t_1$ and a time $t_3$ although the output G is behind the timing of the input signal A. The signal I-3, however, falls at the next varying points $t_2$ and $t_4$ prior to the next sampling point of output G. Therefore, the signal I-3 does not affect the latching operation of DVCO.

Figure 7:
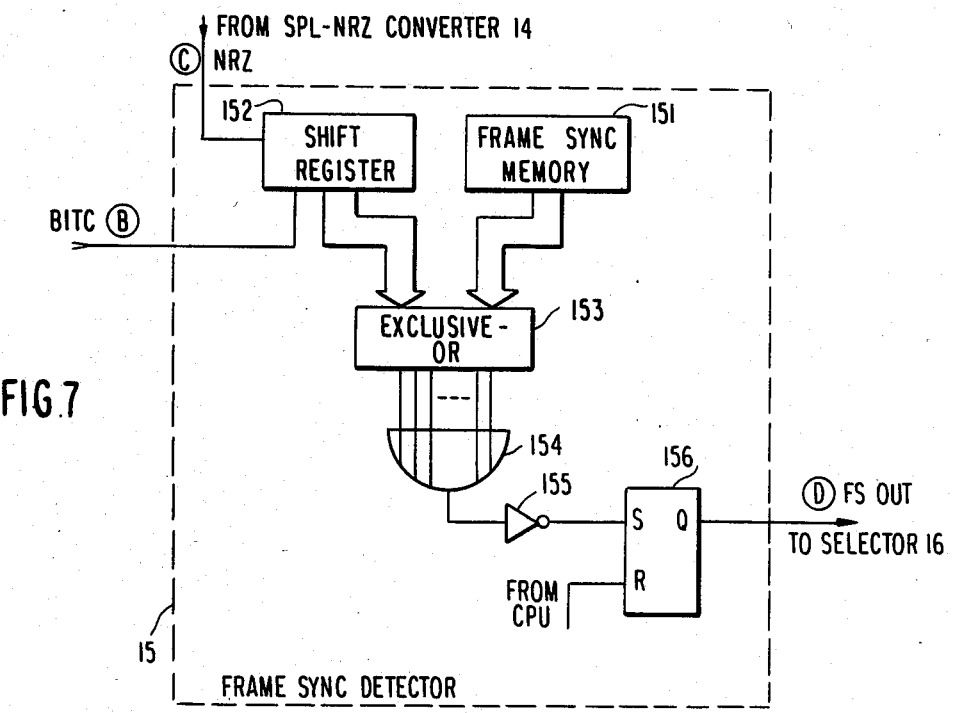
FIG. 7 is a detailed diagram of a frame synchronization signal detector of the circuit shown in FIG. 3.

FIG. 7 is a detailed block diagram of the frame sync signal detector 15. The NRZ signal C from the SPL-NRZ converter 15 is stored in a shift register 152 in synchronism with the regenerated clock B. The output of each stage of the shift register 152 is subject to exclusive-OR operation at an exclusive-OR circuit 153 with each bit of the frame sync signal stored in a memory section 151. Each output of the exclusive-OR circuit 153 is led to an OR gate 154 whose output is in turn supplied to an output inverter 155. Therefore, if a frame sync signal is contained in the NRZ signal C, the inverter 155 will output a logical "1" to set an RS flip-flop 156, and whereby a frame sync signal detection pulse D will be supplied to the terminal Q of the flip-flop 156. The flip-flop 156, which is already set, is reset by the control section (not shown) of a central processing unit (CPU) or the like. The control section may detect the end of data in the input split-phase signal, in accordance with the frame length, to generate a pulse required for resetting the flip-flop 156. In response to the resetting, the selector 16 begins to supply the output of the frequency divider 17 to the phase detector 12 to initialize the timing recovery circuit.

As hitherto described, the use of a timing recovery circuit according to the present invention makes possible proper phase adjustment of clocks even if either "1" or "0" consecutively emerges in the data section after the detection of the frame sync signal FS. Since there is no need to maintain the output of the VCO during the data section, the frame length can be extended without having to use an expensive crystal for the VCO. It is conceivable to do away with the ½ frequency divider and the selector 16 to extract clocks having a frequency twice as high as that of the timing signal (f₂) from the beginning of the input signal A, but this would entail the disadvantage of inviting phase uncertainty (180-degree displacement) in the ½ frequency-divided timing signal. Although this uncertainty can be corrected by detecting the frame sync signal FS, uncertainty would still remain in the section of the frame sync signal FS, whose detection itself would be thereby made inaccurate.

What is claimed is:
1. A timing recovery circuit comprising:
   means for detecting the varying points of a split-phase signal having a pattern of the repetition of logical "1" and "0" at its beginning;
   voltage-controlled oscillator means for generating a signal whose frequency is twice as high as that of the timing signal of said split-phase signal and controlling the frequency of the generated signal in response to a control signal;
   frequency dividing means for dividing by two the output frequency of said voltage-controlled oscillator means;
   selector means for selectively supplying the output of said voltage-controlled oscillator means and that of said frequency dividing means;
   phase detector means for phase-comparing the output of said varying point detector means and that of said selector means, and supplying said voltage-controlled oscillator means with a signal indicating the relative delay or advance between the two outputs as said control signal; and
   control means for controlling said selector means so that it selects the output of said frequency dividing means during said repetitive pattern of logical "1" and "0" and that of said voltage-controlled oscillator means at the times.

2. A timing recovery circuit, as claimed in claim 1, wherein said split-phase signal includes a frame synchronization signal after said repetitive pattern, and wherein said control means comprises converter means receiving said split phase signal and being responsive to the output of said frequency divider means for converting said split-phase signal into a non-return to zero signal, and frame synchronization signal detector means detecting said synchronization signal and supplying a detection signal for distinguishing between said repetitive pattern and other sections of said split phase signal.

3. A timing recovery circuit, as claimed in claim 2, wherein said frame synchronization signal detector means comprises pattern matching means for matching the pattern of said non-return to zero signal and that of said frame synchronization signal, and flip-flop means, being set by the output of said pattern matching means and reset by a signal obtained in response to the completion of the other sections of said split-phase signal, for supplying its output to said selector means.

4. A timing recovery circuit, as claimed in claim 2, wherein said converter means comprises exclusive OR means for taking the exclusive OR of said split-phase signal and the output of said frequency divider means to produce said non-return to zero signal.

* * * * *

UNITED STATES PATENT AND TRADEMARK OFFICE
CERTIFICATE OF CORRECTION

PATENT NO. : 4,661,965
DATED : April 28, 1987
INVENTOR(S) : T. MARU

It is certified that error appears in the above-identified patent and that said Letters Patent is hereby corrected as shown below:

COLUMN 2, LINE 23  After "recovery" delete ","

COLUMN 4, LINE 30  After "G and" insert --$\bar{G}$--

COLUMN 5, LINE 5  Delete "15" insert --14--

COLUMN 6, LINE 22  Delete "the" insert --other--

Signed and Sealed this

Nineteenth Day of July, 1988

Attest:

DONALD J. QUIGG

*Attesting Officer*     *Commissioner of Patents and Trademarks*